United States Patent
Peters

(10) Patent No.: US 6,749,263 B2
(45) Date of Patent: Jun. 15, 2004

(54) FITTING FOR A VEHICLE SEAT

(75) Inventor: Christoph Peters, Wermelskirchen (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 10/260,482

(22) Filed: Sep. 30, 2002

(65) Prior Publication Data

US 2003/0025377 A1 Feb. 6, 2003

Related U.S. Application Data

(63) Continuation of application No. PCT/EP01/13641, filed on Nov. 23, 2001.

(30) Foreign Application Priority Data

Jan. 23, 2001 (DE) .......................................... 101 02 860

(51) Int. Cl.$^7$ ................................................. B60N 2/22
(52) U.S. Cl. ..................................................... 297/367
(58) Field of Search .............................. 297/367, 378.12

(56) References Cited

U.S. PATENT DOCUMENTS

| | | | | |
|---|---|---|---|---|
| 5,749,624 A | * | 5/1998 | Yoshida | 297/367 |
| 5,785,386 A | * | 7/1998 | Yoshida | 297/367 |
| 6,007,152 A | * | 12/1999 | Kojima et al. | 297/367 |
| 6,023,994 A | * | 2/2000 | Yoshida | 297/367 |

FOREIGN PATENT DOCUMENTS

| | | |
|---|---|---|
| EP | 0 749 865 A2 | 12/1996 |
| EP | 0 773 133 A2 | 5/1997 |
| EP | 0 967 110 A2 | 12/1999 |
| EP | 0 967 111 A2 | 12/1999 |
| EP | 1 195 115 A1 | 4/2002 |
| WO | WO 00/44582 A1 | 8/2000 |
| WO | WO 00/76374 A1 | 12/2000 |

* cited by examiner

*Primary Examiner*—Peter R. Brown
(74) *Attorney, Agent, or Firm*—Alston & Bird LLP

(57) ABSTRACT

In the case of a fitting (5) for a vehicle seat, in particular a latching fitting for a motor vehicle seat, having a first fitting part (11), having a second fitting part (12) which can be rotated relative to the first fitting part (11) and can be locked, having at least one latch (21) which is arranged in a manner such that it can move in the radial direction in a guide (15) of the first fitting part (11) and, for locking purposes, interacts with the second fitting part (12), on its side placed radially outward, and having an eccentric (25) which can rotate relative to the fitting parts (11, 12) and acts on the latch (21), on its side placed radially inward, in order to move said latch radially outward, the eccentric (25) acts on the latch (21) via two spaced-apart points (23, 31).

19 Claims, 3 Drawing Sheets

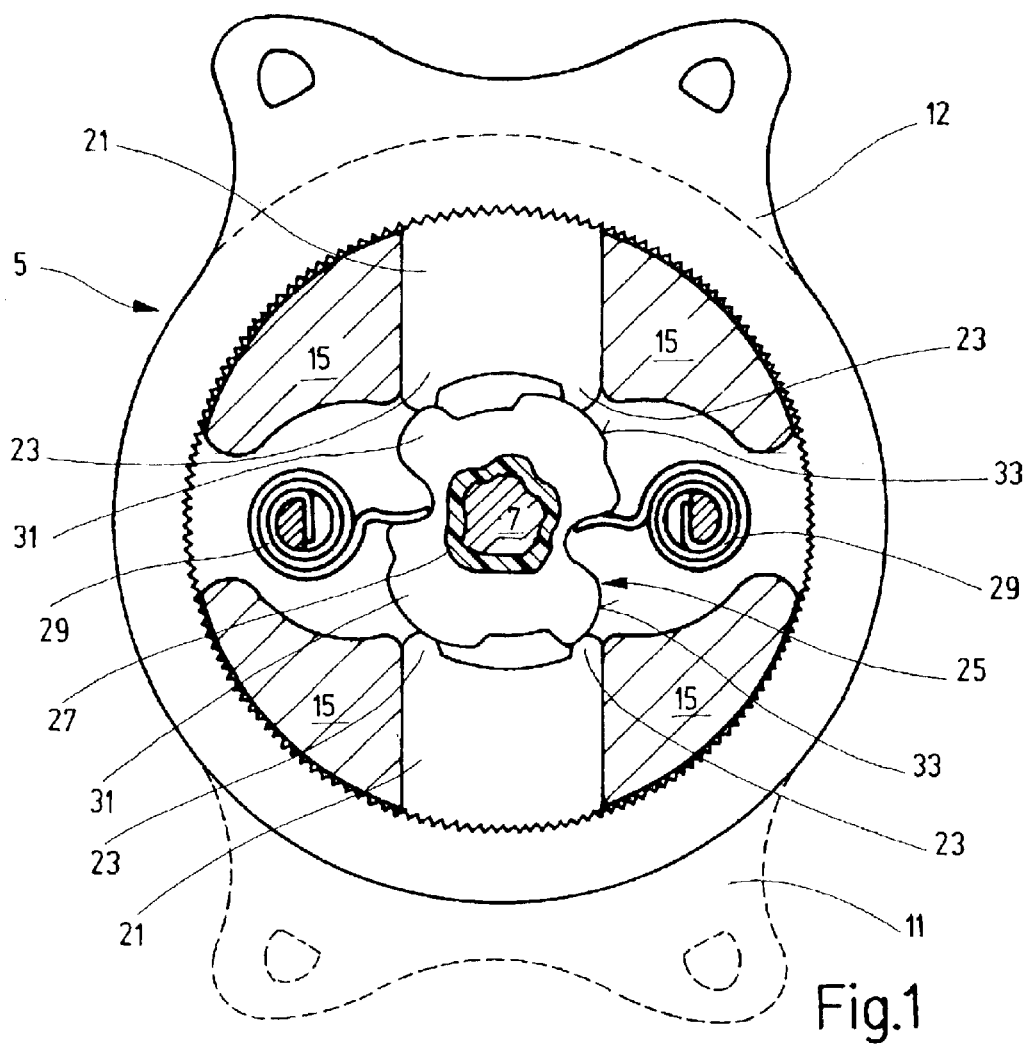
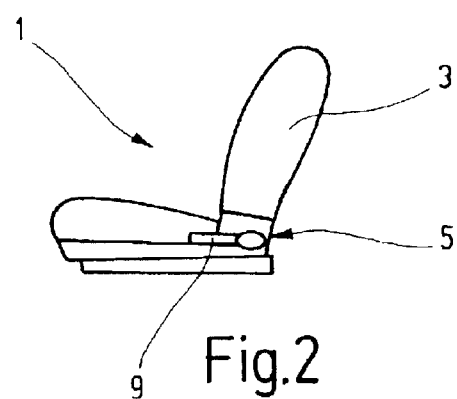

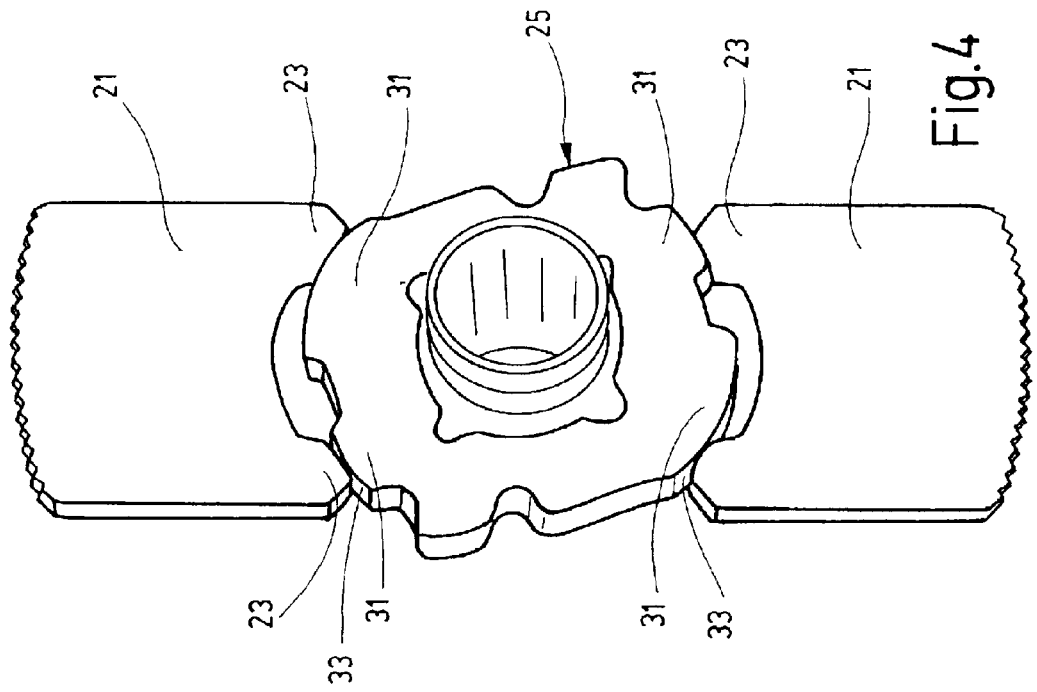
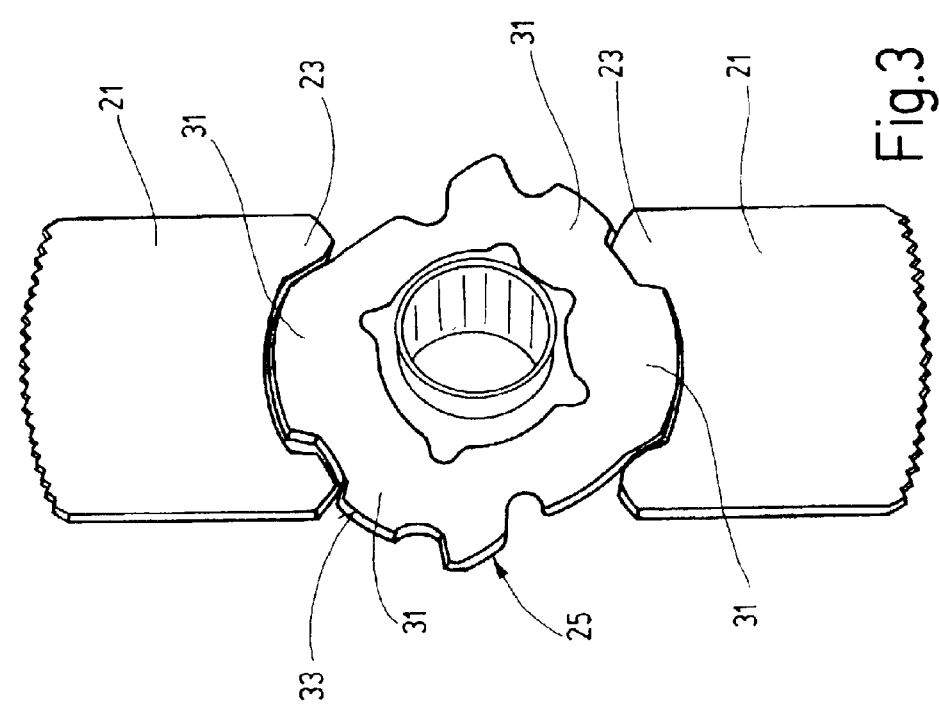

FITTING FOR A VEHICLE SEAT

CROSS-REFERENCE TO RELATED APPLICATION

This application is a continuation of PCT/EP01/13641, which is entirely incorporated herein by reference, was filed Nov. 23, 2001, designates the U.S., and was published in German on Aug. 1, 2002.

BACKGROUND OF THE INVENTION

The present invention relates to a fitting for a vehicle seat, in particular a latching fitting for a motor vehicle seat.

WO 00/44582 discloses a known latch fitting. In the event of a severe load in the direction of rotation, for example in the case of a crash, in which, via the backrest, a torque acts on the fitting part connected thereto, there is the risk, if the guide and the latches which are present are not produced with precise tolerances, of the latches tilting in the guide and, as a consequence, of the toothed overlap between the latch and fitting part being reduced.

BRIEF SUMMARY OF THE INVENTION

One aspect of the present invention is the provision of an improved latch fitting that is suitable for relatively high load requirements and can be provided in a cost-effective manner. In accordance with this aspect, a fitting for a vehicle seat, in particular a latching fitting for a motor vehicle seat, has a lower fitting part, an upper fitting part which can be rotated relative to the lower fitting part, and at least one latch and an eccentric that are cooperative for selectively restricting the rotation of the upper fitting part. The latch is arranged for moving radially in a guide of the lower fitting part. The eccentric is for rotating relative to the fitting parts. When the eccentric rotates, it acts on a radially inward side of the latch, so that the latch moves radially outward and a radially outward side of the latch interacts with the upper fitting part via a meshing of teeth. The meshing restricts the rotation of the upper fitting part. The eccentric acts on the latch via two spaced-apart points.

By the eccentric acting on the latch via two spaced-apart points, the latch, when it receives a load which acts in the circumferential direction and which it experiences when the upper fitting part is loaded, can be better supported on the eccentric, i.e. a blocking force having a relatively large lever arm can oppose possible tilting in the guide. This retains the toothed overlap between the latch and the upper fitting part and therefore ensures the locked state. A considerable increase in load is therefore possible. Since toothed segments are not able to tilt as much, there is simultaneously an improved performance in terms of play.

Preferably, two eccentric cams are arranged on the eccentric and two blocking cams are arranged on the latch, in each case the cams are spaced part by a distance approximately equal to the latch width, as measured transversely to the guide. Apart from the improved support, this has the advantage of reducing the actuating path, since the latch can be activated more easily. The arrangement of the blocking cams and eccentric always ensures that an equilibrium of forces can arise, even under manufacturing tolerances. The bearing between the blocking cams and eccentric takes place within the self-locking range, in order to prevent a transmission of torque to the eccentric. In the case of two latches, the load is mainly conducted diagonally through the eccentric via respective blocking cams, with the result that despite the theoretically four-way support the static precision is maintained.

The play, which has already been reduced by the double support, is preferably further reduced by the eccentric cams having clamping surfaces with different average distances from the center of the eccentric. A tilting movement, which is caused thereby, of the latches, which are movable in the guides owing to tolerances, compensates for the free play. A suitable configuration ensures that the fitting has a low amount of play and great strength.

BRIEF DESCRIPTION OF THE SEVERAL VIEWS OF THE DRAWINGS

The invention is explained in greater detail below with reference to two exemplary embodiments which are illustrated in the drawings, in which FIG. 1 shows a section through the first exemplary embodiment, FIG. 2 shows a vehicle seat provided with the first exemplary embodiment, FIG. 3 shows a partial view of the first exemplary embodiment in the unlocked state, FIG. 4 shows a partial view of the first exemplary embodiment in the locked state.

DETAILED DESCRIPTION OF THE INVENTION

Figure 5:
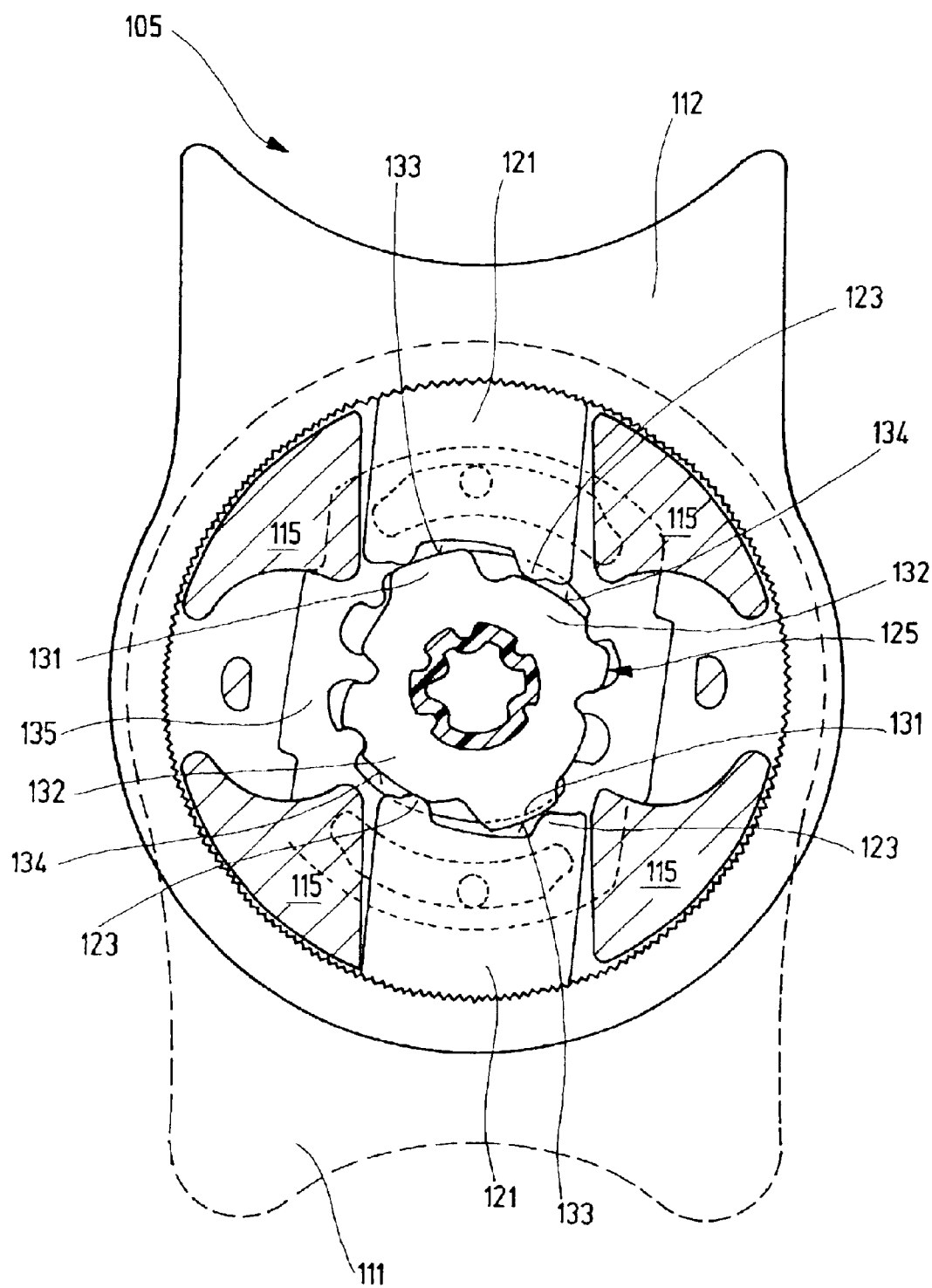
FIG. 5 shows a section through the second exemplary embodiment.

In the first exemplary embodiment, for adjusting the inclination of its backrest 3, a vehicle seat 1 of a motor vehicle has, on both of its sides, a respective fitting 5 which is designed as a latching fitting. The two fittings 5 are in a geared connection to each other by means of a transmission rod 7. A hand lever 9, which sits in a rotationally fixed manner on the transmission rod 7, is used for the manual actuation of the fittings 5. The following directional details refer to the cylindrical coordinate system defined by the transmission rod 7.

Each fitting 5 has, as first fitting part, a lower fitting part 11 and, as second fitting part, a upper fitting part 12, which parts are held together in the axial direction by retaining plates (not illustrated in detail). The lower fitting part 11, which is fixed on the seat part, is provided with four guide and bearing segments 15 which, radially outward, form a cylindrically shaped bearing surface, with four interruptions, for a correspondingly curved, radially inwardly pointing bearing surface of the upper fitting part 12, which is designed as a hollow wheel and is fixed on the backrest. In each case two guide and bearing segments 15 together form a guide which runs radially, for a toothed segment 21 which is arranged in a radially movable manner.

Each toothed segment 21 bears, as a latch, on a convexly curved side placed radially further outward, a multiplicity of teeth which can interact with corresponding teeth of the upper fitting part 12, on the bearing surface thereof, in order to lock the fitting 5. The two sides, which run parallel to the radial direction, are used for guidance by the associated two guide and bearing segments 15. That side of the toothed segment 21 which is predominantly concavely curved and is placed radially further inward, bears two convex blocking cams 23 which are at the greatest possible distance from each other on this side of the toothed segment 21, i.e. are arranged in each case at the corner of one of the two sides running parallel to the radial direction.

In order to push the two toothed segments 21 outward, an eccentric disk 25 is provided, which disk is seated in a rotationally fixed manner on the transmission rod 7 by means of a transmission element 27 in the form of a bushing and which is prestressed by two spiral springs 29. On the outer circumference of the eccentric disk 25 four eccentric cams 31, which project radially outward, are provided with a respective clamping surface 33, which is curved eccentrically with regard to the transmission rod 7. In the circumferential direction between the eccentric cams 31, the eccentric disk 25 springs back radially inward to such an extent that the blocking cams 23 can find a hold. A driver disk, which for the sake of clarity is not illustrated and which also sits in a rotationally fixed manner on the transmission rod 7 by means of the transmission element 27 and which interacts in a manner known per se with the two toothed segments 21 via slot-and-pin guides, is used for returning the toothed segments 21 inward in the radial direction, i.e. for the unlocking, which is initiated by rotation of the transmission rod 7 by means of the hand lever 9.

Starting from an unlocked state in which the two toothed segments 21 are situated radially inward, the prestressing of the spiral springs 29 causes the eccentric disk 25 to be rotated in such a manner that the eccentric cams 31 first of all come to bear against the blocking cams 33. Owing to the radially continuously increasing distance of the clamping surfaces 33 from the center of the eccentric disk 25, i.e. from the transmission rod 7, on further rotation the eccentric cams 31 use the blocking cams 33 to push the toothed segments 21 outward. As soon as the toothed segments 21 come into engagement with the upper fitting part 12, the respective fitting 5 is locked. In this case, the angle between each clamping surface 31 and the associated bearing surface of the blocking cam 23 lies in the self-locking range.

If, in the locked state, the upper fitting part 12 is loaded by a torque, for example in the event of a crash, the toothed segments 21 can tilt via the intermeshing teeth owing to tolerances in their guides. The tilting is opposed by a blocking force, on account of the blocking cams 23 being supported at their edge on the eccentric disk 25, specifically with a lever arm which is large in comparison with a central support. This severely restricts the tilting, so that in the event of a crash the risk of a reduction in the toothed overlap leading to a lower load-bearing capacity of the fitting 5, because then only a few teeth are supported, is reduced, or such a reduction of the toothed overlap occurs only at a very much later time. Loads in and counter to the direction of travel primarily load the blocking cams 23 on the corresponding side and relieve the others of load. As a result, the load is conducted diagonally through the eccentric disk 25, as a result of which static precision is maintained.

The second exemplary embodiment is largely identical to the first exemplary embodiment and so components which are identical and act in an identical manner bear reference numbers which are increased by 100. The fitting 105 according to the second exemplary embodiment likewise comprises a lower fitting part 111 having four guide and bearing segments 115 on which a upper fitting part 112 is mounted rotatably and which serve at the same time as a guide for two toothed segments 121 which can move radially in opposite directions. The toothed segments 121 have two blocking cams 123 on their side pointing radially inward.

A centrally arranged eccentric 125, which is spring-loaded as in the first exemplary embodiment, uses a respective first eccentric cam 131, which trails in the loading direction, and a respective second eccentric cam 132, which is ahead in the loading direction, to push the two toothed segments 121 radially outward where the toothed segments 121 interact with a toothed rim (internal toothing) of the upper fitting part 112, in order to lock the fitting 105. The eccentric cams 131 and 132, which are four in total, are not precisely curved in the shape of a circular arc around the rotational axis of the eccentric 125, but have in each case a first clamping surface 133 or second clamping surface 134 having an increasing radius, i.e. having an eccentric curvature. With regard to the center of the eccentric 125, i.e. the central axis of the transmission rod (not illustrated), each first clamping surface 133 of the first eccentric cam 131 is at a larger average distance (larger average radius) than each second clamping surface 134 of the second eccentric cam 132. A driver disk 135, which is only illustrated in the background in the drawing and which is connected in a rotationally fixed manner to the eccentric 125, is used, as in the first exemplary embodiment, to return the toothed segments 121 in a manner known per se by means of a slot-and-pin guide.

Because of tolerances, there is play between the guide and bearing segments 115 and the toothed segments 121 in the hundredths of a millimeter range, which play would lead to a "free play" at the upper edge of the backrest. The difference, which lies approximately in the tenths of a millimeter range, between the average radii of the eccentric cams 131 and 132 ensures that the toothed segments 121 are forced into a tilted position by the eccentric 125 and are kept there. The tilted position is illustrated in the drawing, not to scale. The tilting movement of the toothed segments 121 takes place until they bear on both sides against the guide and bearing segments 115. This compensates for the "free play" which has already been reduced by the double support. The toothed engagement between the toothed segments 121 and the toothed rim of the upper fitting part 112 is not impaired.

Owing to tolerances, this happens in most cases already at one end of the tilting movement before the two blocking cams 123 bear against the two eccentric cams 131 and 132. The distance of the eccentric 125 from the toothed segment 121 is so small that very high strengths can also be obtained on account of the high static strength of the double support.

For the static precision of the system, it is advantageous if the two supporting points between the eccentric 125 and toothed segment 121 are used only at high loads, and otherwise there is only one supporting point in each case.

That which is claimed:

1. A fitting for a vehicle seat, the fitting comprising:
   a first fitting part including guides;
   a second fitting part mounted for rotating about an axis relative to the first fitting part;
   two latches which are respectively arranged in the guides of the first fitting part for moving radially inward and outward relative to the axis, wherein for each latch, the latch includes:
   inner and outer sides, with the inner side being located radially inward of the outer side, and the outer side being located radially outward of the inner side,
   a first pair of opposite sides that are spaced apart from one another by a first distance and each extend between the inner and outer sides,
   a second pair of opposite sides that are spaced apart from one another by a second distance, which is less than the first distance, and each extend between the inner and outer sides, and
   two blocking cams which are arranged on, and spaced apart from one another along, the inner side of the latch so that:
   one of the blocking cams is contiguous with one of the sides of the first pair of sides of the latch, and the other of the blocking cams is contiguous with the other of the sides of the first pair of sides of the latch; and an eccentric mounted for rotating relative to the fitting parts so that eccentric cams of the eccentric respectively engage the blocking cams and thereby move each latch radially outward so that the outer side of each latch interacts with the second fitting part to restrict rotation of the second fitting part, wherein while the eccentric cams have respectively engaged the blocking cams and moved the latches radially outward so that the outer side of each latch interacts with the second fitting part to restrict rotation of the second fitting part:

there are substantially only two areas of engagement between the eccentric and the first latch, with the two areas of engagement between the eccentric and the first latch being spaced apart from one another and consisting essentially of:

a first area of engagement which is between a first eccentric cam of the eccentric cams and a first of the blocking cams of the first latch, and a second area of engagement which is between a second eccentric cam of the eccentric cams and a second of the blocking cams of the first latch, and there are substantially only two areas of engagement between the eccentric and the second latch, with the two areas of engagement between the eccentric and the second latch being spaced apart from one another and consisting essentially of:

a third area of engagement which is between a third eccentric cam of the eccentric cams and a first of the blocking cams of the second latch, and a fourth area of engagement which is between a fourth eccentric cam of the eccentric cams and a second of the blocking cams of the second latch, and wherein:

a width of the guide in which the first latch is arranged is at least as large as a distance between:

a portion of the first area of engagement that is farthest from the second area of engagement, and a portion of the second area of engagement that is farthest from the first area of engagement;

the width and the distance extend in a common direction;

a width of the guide in which the second latch is arranged is at least as large as a distance between:

a portion of the third area of engagement that is farthest from the fourth area of engagement, and a portion of the fourth area of engagement that is farthest from the third area of engagement; and the width of the guide in which the second latch is arranged and the distance between the portions of the third and fourth areas of engagement extend in a common direction.

2. A fitting according to claim 1, wherein the first and second eccentric cams are at a distance from each other that is approximately equal to a width of the first latch, with the width of the first latch being measured in a direction transverse to the guide in which the first latch is arranged.

3. A fitting according to claim 1, wherein for each of the eccentric cams of the eccentric, the eccentric cam has an eccentrically curved clamping surface with which the eccentric cam acts on the respective blocking cam to provide the respective area of engagement.

4. A fitting according to claim 1, wherein:

for each of the first and second eccentric cams of the eccentric, the eccentric cam has a clamping surface with which the eccentric cam acts on the respective one of the first and second blocking cams of the first latch to provide the respective one of the first and second areas of engagement, and the clamping surface of the first eccentric cam of the eccentric is at a greater average distance from the center of the eccentric than the clamping surface of the second eccentric cam of the eccentric.

5. A fitting according to claim 1, wherein when the eccentric cams respectively bear against the blocking cams, angles respectively defined between adjacent surfaces of the eccentric cams and the blocking cams provide a self-locking affect.

6. A fitting according to claim 1, wherein when the second fitting part is exposed to a load, which seeks to cause the rotation of the second fitting part, while the first latch is in the outward position:

the second fitting part exerts a load on the first latch, with the load on the first latch having at least a component that extends in a loading direction which is tangential to the rotation of the second fitting part, the first blocking cam of the first latch is ahead of the second blocking cam of the first latch in the loading direction, and the first latch is supported on the eccentric predominantly via the first blocking cam.

7. A fitting according to claim 6, wherein:

the eccentric is positioned between the first and second latches; and when the second fitting part is exposed to the load, which seeks to cause the rotation of the second fitting part, while the first and second latches are restricting the rotation of the second fitting part:

the first and second latches receive loads, and the first and second latches respectively conduct the loads diagonally through the eccentric.

8. A fitting according to claim 1, wherein the fitting is in combination with the vehicle seat for adjusting an inclination of a backrest of the vehicle seat.

9. A fitting according to claim 1, wherein when the second fitting part is exposed to a load, which seeks to cause the rotation of the second fitting part, while the first latch is in the outward position:

the second fitting part exerts a load on the first latch, with the load on the first latch having at least a component that extends in a loading direction which is tangential to the rotation of the second fitting part, a first of the blocking cams of the first latch is ahead of another of the blocking cams of the first latch in the loading direction, and the first latch is supported on the eccentric predominantly via the first blocking cam.

10. A fitting according to claim 9, wherein:

the eccentric is positioned between the first and second latches; and when the second fitting part is exposed to the load, which seeks to cause the rotation of the second fitting part, while the first and second latches are restricting the rotation of the second fitting part:

the first and second latches receive loads, and the first and second latches respectively conduct the loads diagonally through the eccentric.

11. A fitting according to claim 1, wherein the first and second blocking cams are spaced apart form one another by approximately the first distance, and the third and fourth blocking cams are spaced apart form one another by approximately the first distance.

12. A fitting for a vehicle seat, the fitting comprising:
a first fitting part including guides;
a second fitting part mounted for rotating about an axis relative to the first fitting part;
two latches which are respectively arranged in the guides of the first fitting part for moving radially inward and outward relative to the axis, wherein for each latch, the latch includes:
  inner and outer sides, with the inner side being located radially inward of the outer side, and the outer side being located radially outward of the inner side,
  a first pair of opposite sides that are spaced apart from one another by a first distance and each extend between the inner and outer sides,
  a second pair of opposite sides that are spaced apart from one another by a second distance, which is less than the first distance, and each extend between the inner and outer sides, and
  two blocking cams which are arranged on, and spaced apart from one another along, the inner side of the latch so that:
    one of the blocking cams is contiguous with one of the sides of the first pair of sides of the latch, and
    the other of the blocking cams is contiguous with the other of the sides of the first pair of sides of the latch; and
an eccentric mounted for rotating relative to the fitting parts so that eccentric cams of the eccentric respectively engage the blocking cams and thereby move each latch radially outward so that the outer side of each latch interacts with the second fitting part to restrict rotation of the second fitting part; and
a driver disk mounted for rotating with the eccentric, wherein the driver disk respectively interacts with the latches via slot and pin guide systems to move the latches radially inwards,
wherein while the eccentric cams have respectively engaged the blocking cams and moved the latches radially outward so that the outer side of each latch interacts with the second fitting part to restrict rotation of the second fitting part:
  there are substantially only two areas of engagement between the eccentric and the first latch, with the two areas of engagement between the eccentric and the first latch being spaced apart from one another and consisting essentially of:
    a first area of engagement which is between a first eccentric cam of the eccentric cams and a first of the blocking cams of the first latch, and
    a second area of engagement which is between a second eccentric cam of the eccentric cams and a second of the blocking cams of the first latch, and
  there are substantially only two areas of engagement between the eccentric and the second latch, with the two areas of engagement between the eccentric and the second latch being spaced apart from one another and consisting essentially of:
    a third area of engagement which is between a third eccentric cam of the eccentric cams and a first of the blocking cams of the second latch, and
    a fourth area of engagement which is between a fourth eccentric cam of the eccentric cams and a second of the blocking cams of the second latch.

13. A fitting according to claim 12, wherein when the second fitting part is exposed to a load, which seeks to cause the rotation of the second fitting part, while the first latch is in the outward position:
  the second fitting part exerts a load on the first latch, with the load on the first latch having at least a component that extends in a loading direction which is tangential to the rotation of the second fitting part,
  the first blocking cam of the first latch is ahead of the second blocking cam of the first latch in the loading direction, and
  the first latch is supported on the eccentric predominantly via the first blocking cam.

14. A fitting according to claim 13, wherein:
  the eccentric is positioned between the first and second latches; and
  when the second fitting part is exposed to the load, which seeks to cause the rotation of the second fitting part, while the first and second latches are restricting the rotation of the second fitting part:
    the first and second latches receive loads, and
    the first and second latches respectively conduct the loads diagonally through the eccentric.

15. A fitting according to claim 12, wherein when the eccentric cams respectively bear against the blocking cams, angles respectively defined between adjacent surfaces of the eccentric cams and the blocking cams provide a self-locking affect.

16. A fitting for a vehicle seat, the fitting comprising:
a first fitting part including guides;
a second fitting part mounted for rotating about an axis relative to the first fitting part;
two latches which are respectively arranged in the guides of the first fitting part for moving radially inward and outward relative to the axis, wherein for each latch, the latch includes:
  inner and outer sides, with the inner side being located radially inward of the outer side, and the outer side being located radially outward of the inner side,
  a first pair of opposite sides that are spaced apart from one another by a first distance and each extend between the inner and outer sides,
  a second pair of opposite sides that are spaced apart from one another by a second distance, which is less than the first distance, and each extend between the inner and outer sides, and
  two blocking cams which are arranged on, and spaced apart from one another along, the inner side of the latch so that:
    one of the blocking cams is contiguous with one of the sides of the first pair of sides of the latch, and
    the other of the blocking cams is contiguous with the other of the sides of the first pair of sides of the latch; and
an eccentric mounted for rotating relative to the fitting parts so that eccentric cams of the eccentric respectively engage the blocking cams and thereby move each latch radially outward so that the outer side of each latch interacts with the second fitting part to restrict rotation of the second fitting part,
wherein while the eccentric cams have respectively engaged the blocking cams and moved the latches radially outward so that the outer side of each latch interacts with the second fitting part to restrict rotation of the second fitting part:

there are substantially only two areas of engagement between the eccentric and the first latch, with the two areas of engagement between the eccentric and the first latch being spaced apart from one another and consisting essentially of:
- a first area of engagement which is between a first eccentric cam of the eccentric cams and a first of the blocking cams of the first latch, and
- a second area of engagement which is between a second eccentric cam of the eccentric cams and a second of the blocking cams of the first latch, and there are substantially only two areas of engagement between the eccentric and the second latch, with the two areas of engagement between the eccentric and the second latch being spaced apart from one another and consisting essentially of:
- a third area of engagement which is between a third eccentric cam of the eccentric cams and a first of the blocking cams of the second latch, and
- a fourth area of engagement which is between a fourth eccentric cam of the eccentric cams and a second of the blocking cams of the second latch, and wherein for each latch and the guide in which the latch is arranged:
- a width of the guide is at least as large as a distance between:
  - a portion of the first blocking cam that is farthest from the second blocking cam, and
  - a portion of the second blocking cam that is farthest from the first blocking cam, and
- the width and the distance extend in a common direction.

17. A fitting according to claim 16, wherein when the second fitting part is exposed to a load, which seeks to cause the rotation of the second fitting part, while the first latch is in the outward position:

the second fitting part exerts a load on the first latch, with the load on the first latch having at least a component that extends in a loading direction which is tangential to the rotation of the second fitting part, the first blocking cam of the first latch is ahead of the second blocking cam of the first latch in the loading direction, and the first latch is supported on the eccentric predominantly via the first blocking cam.

18. A fitting according to claim 17, wherein:

the eccentric is positioned between the first and second latches; and when the second fitting part is exposed to the load, which seeks to cause the rotation of the second fitting part, while the first and second latches are restricting the rotation of the second fitting part:
  the first and second latches receive loads, and
  the first and second latches respectively conduct the loads diagonally through the eccentric.

19. A fitting according to claim 16, wherein the first and second blocking cams are spaced apart form one another by approximately the first distance, and the third and fourth blocking cams are spaced apart form one another by approximately the first distance.

* * * * *